ated June 22, 1965

3,190,881
1,3-DISUBSTITUTED 4-OXO-2-THIO-1,2,3,4-TETRA-HYDROPYRIMIDO[4,5-d]PYRIMIDINES

Viktor Papesch, Morton Grove, Ill., assignor to G. D. Searle & Co., Chicago, Ill., a corporation of Delaware
No Drawing. Filed Jan. 17, 1963, Ser. No. 252,035
7 Claims. (Cl. 260—256.5)

The present invention relates to a group of substituted bicyclic heterocyclic compounds. More particularly, it relates to compounds of the following general formula

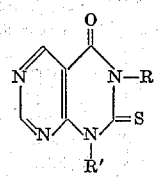

wherein R is lower alkyl and R' is selected from the group consisting of lower alkyl, lower alkenyl, hydroxy lower alkyl, monocyclic aryl, and aryl substituted lower alkyl radicals.

The lower alkyl radicals referred to above contain up to six carbon atoms and are exemplified by radicals such as methyl, ethyl, propyl, isopropyl, butyl, pentyl, and hexyl. The lower alkenyl radicals referred to above likewise contain up to six carbon atoms and are exemplified by radicals such as allyl and methallyl. Similarly, the hydroxy lower alkyl radicals referred to above contain up to six carbon atoms and are restricted to radicals containing a single hydroxy group. Examples of the hydroxy lower alkyl radicals are hydroxymethyl, hydroxyethyl, 2-hydroxypropyl, 3-hydroxypropyl, 4-hydroxybutyl, 5-hydroxypentyl, and 6-hydroxyhexyl.

The monocyclic aryl radicals referred to above can be exemplified by phenyl and various substituted phenyl radicals. The monocyclic aryl-substituted alkyl radicals are exemplified by groups such as benzyl, phenethyl, and 3-phenylpropyl.

The compounds of this invention possess valuable pharmacological properties. In particular, the present compounds are central nervous system stimulants. They also possess anti-inflammatory activity which is demonstrated by a phenylbutazone-like effect on edematous conditions. They are also diuretics and pepsin inhibitors. In addition, they are active antibiotic agents as is demonstrated by their inhibition of the growth of the organisms *Trichophyton mentagrophytes*, and *Chlorella vulgaris*.

The compounds of the present invention are conveniently prepared by heating the appropriate 6-amino-2-thiouracil with trisformamidomethane at a temperature preferably above 100° C.

The 1,3-disubstituted 6-amino-2-thiouracils, which are intermediates to the compounds of the present invention, are conveniently prepared from the appropriate N,N-disubstituted thiourea. The thiourea is condensed with cyanoacetic acid in acetic acid to give the corresponding N-cyanoacetyl compound and this is then cyclized to the thiouracil in the presence of base. Alternatively, ethyl cyanoacetate and a sodium alkoxide can be substituted for the cyanoacetic acid and acetic acid to give the thiouracil in a single step. The necessary intermediate disubstituted thioureas are conveniently prepared from an alkyl isothiocyanate and the appropriate amine.

The compounds which constitute this invention and their preparation will appear more fully from a consideration of the following examples which are given for the purpose of illustration only and are not to be construed as limiting the invention in spirit or in scope. In these examples, quantities are indicated in parts by weight and temperatures in degrees centigrade (° C.).

Example 1

45 parts of 1,3-diethylthiourea is dissolved in 105 parts of glacial acetic acid and 108 parts of acetic anhydride. To the resultant solution is added 33 parts of cyanoacetic acid and the mixture is heated for 15 minutes at 68° C. Most of the solvent is then removed by vacuum distillation at a vapor temperature of about 40° C. When the distillation becomes rather slow, 30 parts of water is added and distillation is resumed until all the volatile material has been removed. The bath temperature should not exceed 60° C. during this distillation period.

To the resulting thick syrup, consisting mainly of 1,3-diethyl-3-cyanoacetyl thiourea, there is added sufficient 10% sodium hydroxide solution to neutralize the mixture and a few additional drops of 70% sodium hydroxide solution. The mixture becomes hot and is stirred. Crystals appear within a short time. The resultant mixture is cooled and filtered and the filtered solid is dried and recrystallized from 20% ethanol to give 6-amino-1,3-diethyl-2-thiouracil melting at about 178–182° C.

If an equivalent quantity of 1,3-dimethyl-thiourea is substituted for the 1,3-diethylthiourea and the above procedure is repeated, the product is 6-amino-1,3-dimethyl-2-thiouracil melting at about 290–293° C.

Example 2

5 parts of 6-amino-1,3-dimethyl-2-thiouracil and 10 parts of trisformamidomethane are heated briefly to cause the mixture to sinter and the mixture is then heated in an oil bath at 140° C. for 20 hours. The cooled mixture is filtered and the precipitate is recrystallized several times from ethanol to give 1,3-dimethyl-4-oxo-2-thio-1,2,3,4-tetrahydropyrimido[4,5-d]pyrimidine melting at about 149–151° C. This compound has the following formula

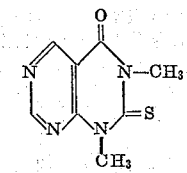

Example 3

5 parts of 6-amino-1,3-diethyl-2-thiouracil and 10 parts of trisformamidomethane are heated together for 20 hours in an oil bath at about 140° C. The mixture is cooled and then filtered to remove a small amount of liquid, and the solid is recrystallized twice from ethanol to give 1,3-diethyl-4-oxo-2-thio-1,2,3,4-tetrahydropyrimido[4,5-d]pyrimidine melting at about 77–78° C.

Example 4

3.5 parts of 6-amino-1-methallyl-3-methyl-2-thiouracil and 7 parts of trisformamidomethane are heated in an oil bath at 140° C. for 22 hours. The mixture is cooled and filtered and the precipitate is recrystallized several times from methanol to give 1-methallyl-3-methyl-4-oxo-2-thio-1,2,3,4-tetrahydropyrimido[4,5-d]pyrimidine melting at about 107–108.5° C. This compound has the following formula

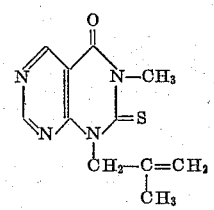

Example 5

4.5 parts of 1-allyl-6-amino-3-ethyl-2-thiouracil and 9 parts of trisformamidomethane are heated together in an oil bath at 140° C. for 22 hours. The mixture is cooled in an ice bath and filtered to remove a small amount of liquid. The precipitate is dissolved in benzene and chromatographed on a silica gel column and the column is eluted with benzene containing increasing amounts of ethyl acetate. The fraction containing 2% ethyl acetate in benzene is separated, and the solvent evaporated. The solid residue is recrystallized several times from pentane to give 1-allyl-3-ethyl-4-oxo-2-thio-1,2,3,4-tetrahydropyrimido[4,5-d]pyrimidine melting at about 69–70° C.

Example 6

To a solution of 78.8 parts of methyl isothiocyanate and 80 parts of absolute ethanol is added slowly 80 parts of ethanolamine with stirring and cooling to maintain the temperature below 50° C. The mixture is then cooled in an ice bath and the precipitate which forms is filtered and washed twice with a 1:5 acetone-ether solution. The resultant precipitate is recrystallized from absolute ethanol and then washed with dry ether to give 1-methyl-3-(2-hydroxyethyl)thiourea melting at about 71–72° C.

To a solution of 18.4 parts of sodium in 440 parts of absolute ethanol is added 104 parts of 1-methyl-3-(2-hydroxyethyl)thiourea and 94 parts of ethyl cyanoacetate. The resultant mixture is refluxed for 2 hours and it is then neutralized by the addition of concentrated hydrochloric acid with cooling. Precipitated solids are removed from the mixture by filtration and the filtrate is concentrated under reduced pressure to give a syrupy residue. This residue is mixed with crushed ice and a small amount of acetone. The precipitate which forms is filtered and recrystallized from water to give 6-amino-1-(2-hydroxyethyl)-3-methyl-2-thiouracil melting at about 240° C.

In a similar manner, methyl isothiocyanate is reacted with 3-amino-1-propanol to give 1-methyl-3-(3-hydroxypropyl)thiourea and this is then reacted with ethyl cyanoacetate to give 6-amino-1-(3-hydroxypropyl)-3-methyl-2-thiouracil.

Example 7

A mixture of 10 parts of 6-amino-1-(2-hydroxyethyl)-3-methyl-2-thiouracil and 20 parts of trisformamidomethane is heated to 185° C. by means of a silicone bath. It is then cooled to 135° C. and kept at that temperature for 20 hours. The mixture is extracted with four portions of benzene. The benzene extracts are combined, the solvent is evaporated, and the residue is treated with 132 parts of benzene. The resultant benzene solution is chromatographed on a silica column which is eluted with benzene containing increasing amounts of ethyl acetate. An eluate consisting of 20% ethyl acetate in benzene is separated. The solvent is evaporated and the crystalline residue is recrystallized from a mixture of benzene and hexane to give 1-(2-hydroxyethyl)-3-methyl-4-oxo-2-thio-1,2,3,4-tetrahydropyrimido[4,5-d]pyrimidine, melting at about 90–93° C.

If 6-amino-1-(3-hydroxypropyl)-3-methyl-2-thiouracil is reacted with trisformamidomethane according to the above procedure, the product is 1-(3-hydroxypropyl)-3-methyl-4-oxo-2-thio-1,2,3,4-tetrahydropyrimido[4,5-d]pyrimidine. This compound has the following formula

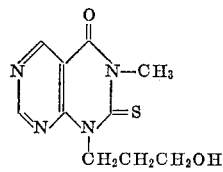

Example 8

A mixture of 49 parts of 1-methyl-3-phenylthiourea, 90 parts of acetic acid, 93 parts of acetic anhydride, and 28.7 parts of cyanoacetic acid is stirred and warmed gently to give a solution of the materials. This solution is allowed to stand at room temperature for about 5 hours during which time a precipitate forms. The solid is separated and recrystallized from ethanol to give 1-cyanoacetyl-1-methyl-3-phenylthiourea melting at about 138–139° C.

48 parts of 1-cyanoacetyl-1-methyl-3-phenylthiourea is added to 188 parts of 10% sodium hydroxide solution which is preheated to 90° C. The mixture is stirred at 90° C. for about 10 minutes and then cooled. A precipitate forms and this is separated by filtration and washed with water to give 6-amino-1-phenyl-3-methyl-2-thiouracil melting at about 288–289° C. after recrystallization from ethanol.

Example 9

A mixture of 4 parts of 6-amino-1-phenyl-3-methyl-2-thiouracil and 8 parts of trisformamidomethane is preliminarily heated to 185° C. and then heated at a temperature of 140° C. for 20 hours. The reaction mixture is cooled and the resultant thick paste is filtered and the solid is recrystallized twice from ethanol to give 3-methyl-1-phenyl-4-oxo-2-thio-1,2,3,4-tetrahydropyrimido[4,5-d]pyrimidine melting at about 207–209° C.

Example 10

A mixture of 23 parts of 1-benzyl-3-methyl-thiourea, 12.4 parts of cyanoacetic acid, 39 parts of glacial acetic acid and 40 parts of acetic anhydride is heated at 60° C. for 15 minutes. The mixture is distilled under reduced pressure to remove the volatile components. The residual syrup is then neutralized with 15% sodium hydroxide solution and made alkaline. The resultant mixture is stirred at 65° C. for 10 minutes before it is cooled. The aqueous layer is decanted and the residual solid is recrystallized twice from ethanol to give 6-amino-1-benzyl-3-methyl-2-thiouracil melting at about 236–237° C.

Example 11

A mixture of 4 parts of 6-amino-1-benzyl-3-methyl-2-thiouracil and 8 parts of trisformamidomethane is heated for 15 minutes in an oil bath at 150–155° C. and then for 20 hours at 140° C. The reaction mixture is cooled, the liquid is decanted from the mixture and the solid is recrystallized several times from ethanol to give 1-benzyl-3-methyl-4-oxo-2-thio-1,2,3,4-tetrahydropyrimido[4,5-d]-pyrimidine melting at about 126.5–128° C. This compound has the following formula

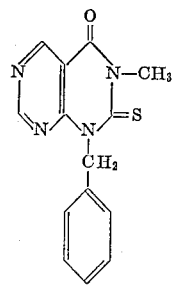

What is claimed is:

1. A compound of the formula

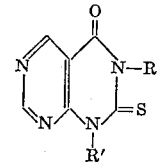

wherein R is lower alkyl and R′ is selected from the group consisting of lower alkyl, lower alkenyl, hydroxy lower alkyl, phenyl, and benzyl.

2. A compound of the formula

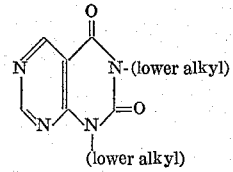

3. 1,3-dimethyl - 4 - oxo-2-thio-1,2,3,4-tetrahydropyrimido[4,5-d]pyrimidine.

4. 1,3-diethyl - 4 - oxo - 2 - thio-1,2,3,4-tetrahydropyrimido[4,5-d]pyrimidine.

5. A compound of the formula

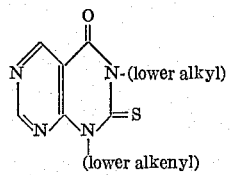

6. 1-methylallyl-3-methyl - 4 - oxo - 2 - thio-1,2,3,4-tetrahydropyrimido[4,5-d]pyrimidine.

7. 1-(2-hydroxyethyl)-3-methyl - 4 - oxo-2-thio-1,2,3,4-tetrahydropyrimido[4,5-d]pyrimidine.

References Cited by the Examiner

UNITED STATES PATENTS

| 2,650,923 | 9/53 | Papesch | 260—256.5 |
| 3,080,364 | 3/63 | Schroeder | 260—256.5 |

FOREIGN PATENTS 229,898  8/60  Australia.

OTHER REFERENCES

Bredereck et al: Angew. Chemie, vol. 72, page 77 (1960).

IRVING MARCUS, *Primary Examiner.*

NICHOLAS S. RIZZO, *Examiner.*

UNITED STATES PATENT OFFICE
CERTIFICATE OF CORRECTION

Patent No. 3,190,881　　　　　　　　　　　　　　June 22, 1965

Viktor Papesch

It is hereby certified that error appears in the above numbered patent requiring correction and that the said Letters Patent should read as corrected below.

Column 2, line 22, for "1,3-dimethyl-thiourea" read -- 1,3-dimethylthiourea --; column 4, line 30, for "3-methyl-thiourea" read -- 3-methylthiourea --; column 5, lines 3 to 8, the formula should appear as shown below instead of as in the patent:

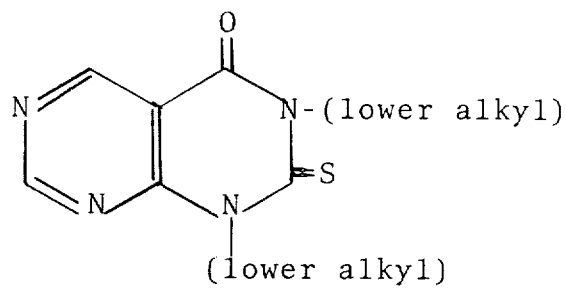

Signed and sealed this 24th day of May 1966.

(SEAL)
Attest:

ERNEST W. SWIDER　　　　　　　　　　　　　　EDWARD J. BRENNER
Attesting Officer　　　　　　　　　　　　　Commissioner of Patents